United States Patent [19]

Taylor

[11] 4,292,105

[45] Sep. 29, 1981

[54] METHOD OF IMPREGNATING A FIBROUS TEXTILE MATERIAL WITH A PLASTIC RESIN

[75] Inventor: Gordon J. Taylor, Hinckley, Ohio

[73] Assignee: Union Carbide Corporation, New York, N.Y.

[21] Appl. No.: 974,012

[22] Filed: Dec. 28, 1978

[51] Int. Cl.³ .............................................. B29B 25/00
[52] U.S. Cl. ..................................... 156/242; 427/331; 427/375; 427/376.1; 427/389.9
[58] Field of Search ................... 156/62.8, 242, 305; 427/189, 195, 331, 375, 376 R, 390 R, 394, 381, 376.1, 389.9; 428/284, 287, 289, 290

[56] References Cited

U.S. PATENT DOCUMENTS

| | | | |
|---|---|---|---|
| 3,432,339 | 3/1969 | Howell et al. | 427/375 |
| 3,843,386 | 10/1974 | Ribbans | 427/331 |
| 3,904,795 | 9/1975 | Mercurio | 427/378 |
| 3,930,097 | 12/1975 | Alberino | 427/331 |
| 3,939,024 | 2/1976 | Hoggatt | 156/242 |

Primary Examiner—Caleb Weston
Attorney, Agent, or Firm—John R. Doherty

[57] ABSTRACT

A method of impregnating a fibrous textile material with a plastic resin so as to produce an impregnated fibrous textile material which can be laminated under heat and pressure to produce a composite article. Such method comprises forming a dispersion of a powdered plastic resin in water which has been thickened by means of a water-soluble thickener; applying the dispersion to a fibrous textile material to distribute the resin over the fibers thereof; drying the fibrous textile material treated in this manner to remove the water present; and heating the dried material at a temperature sufficiently elevated to cause the resin to fuse and form a matrix for the fibers.

17 Claims, No Drawings

METHOD OF IMPREGNATING A FIBROUS TEXTILE MATERIAL WITH A PLASTIC RESIN

BACKGROUND OF THE INVENTION

This invention relates to a method of impregnating a fibrous textile material with a plastic resin so as to form an impregnated fibrous textile material which can be hot pressed to produce a laminated composite article.

Fibrous textile materials impregnated with a plastic resin which can be hot pressed to produce laminated composite articles are commonly called "prepregs". Such materials are usually prepared in easy-to-handle sheet or other form by impregnating continuous lengths of fabric or fibers with a suitable moulding resin. The resins employed are usually thermosetting resins which are advanced to the B-stage, or partially polymerized, after impregnation. In this state, the impregnated material can be stored for reasonable lengths of time under normal storage conditions. At the appropriate time, it can be laminated and hot pressed into a desired form under conditions which effect cure of the resin.

Many of the resins employed to impregnate fibrous textile materials to form prepregs are in liquid form and impregnation can be readily effected with such resins by simply immersing the fibrous materials in these resins. Other resins are readily soluble in organic solvents and present no impregnation problems, although solutions of such resins often have a limited shelf life and may present health and environmental problems due to the nature of the solvents employed. A great many resins, however, particularly the thermoplastics, are solids and can only be solubilized with great difficulty, or sometimes not at all.

In order to effect impregnation with these insoluble or difficulty-soluble solid resins, it is usually necessary to employ hot melt techniques. This is usually done by distributing such resin over a fibrous material as a fine powder and then fusing it to infiltrate it around the fibers thereof. However, because of the high surface area of the fibrous material, and because the viscosity of the polymer melt is usually very high, even at elevated temperatures, it is difficult to achieve good wetting of the fibers by such technique, i.e., it is difficult to produce a uniformly impregnated material by such procedure.

SUMMARY OF THE INVENTION

The present invention provides a method of impregnating a fibrous textile material with a plastic resin so as to produce an impregnated fibrous textile material which can be laminated under heat and pressure to produce a composite article. Such method comprises forming a dispersion of a powdered plastic resin in water which has been thickened by means of a water-soluble thickener; applying the dispersion to a fibrous textile material to distribute the resin over the fibers thereof; drying the fibrous textile material treated in this manner to remove the water present; and heating the dried material at a temperature sufficiently elevated to cause the resin to fuse and form a matrix for the fibers.

DESCRIPTION OF THE PREFERRED EMBODIMENTS

As a result of the modified hot melt process proposed herein, it is now possible to more evenly distribute a solid plastic resin over a fibrous textile material than heretofore possible by such technique, and thereby produce a more uniformly impregnated material. In addition, such procedure presents no solvent recovery or waste water purification problems as is the case when impregnation is effected by means of solutions of resin in organic solvents.

While the method of the present invention is generally applicable whenever it is desired to impregnate a fibrous textile material with a solid plastic resinous material, it is particularly suitable when the resin employed is insoluble, or difficulty soluble, and can only be applied using hot melt techniques. For this reason, the method is particularly applicable to forming prepregs with thermoplastic resins. Prepregs prepared with thermoplastic resins are often preferred over prepregs prepared with thermosetting resins because composite articles prepared with thermoplastic prepregs can be easily post-formed and reshaped if defects are found whereas articles prepared with thermosetting prepregs cannot be reprocessed or reformed after cure. In the latter instance, the entire article must be scrapped if found defective. In addition, while prepregs prepared with thermoplastic resins have an almost infinite shelf life, prepregs prepared with thermosetting resins have a finite shelf life, usually no more than one year. Furthermore, when hot pressing the latter, extreme caution must be taken in effecting cure to ensure that reaction proceeds at a proper rate since the amount of heat, heating time and pressure during cure are all extremely critical. No such caution is necessary in the case of thermoplastic prepregs as these materials do not undergo any cure.

Before dispersing the powdered plastic resin in the aqueous dispersing medium, it is necessary to increase the viscosity of the water by adding to it a water-soluble thickener. Any material which is soluble in water and capable of thickening it to a consistency having sufficient body to hold the resin particles uniformly in suspension can be employed. A viscosity of at least 300 centipoises at 25° C. is generally required for this purpose; however, the solution must remain thin enough to flow around and saturate the fibrous textile material so that the viscosity generally should not exceed 5000 centipoises at 25° C. Preferably the solution has a viscosity of 400 centipoises to 3000 centipoises at 25° C.

Suitable thickeners include polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch, agar-agar, casein, gelatin, and the like. In order to avoid contamination of the resin and possible degradation of the properties of the composite product of the invention, it is preferred to employ a fugitive thickener which will volatilize during fusion of the resin. Polyethylene oxide and hydroxyethyl cellulose are especially suitable thickeners. Although either can be employed alone, it has been found that the two in combination impart excellent flow characteristics to the solution.

The polyethylene oxide suitable for use in the invention is water soluble, has a molecular weight of from about 100,000 up to about 5,000,000, and is commercially available from Union Carbide Corporation under the trademark "Polyox." Grade WSR N-3000 has been found to be especially suitable. This grade has a molecular weight of about 400,000 and a 3 percent aqueous solution of this material has a viscosity of between about 300 centipoises and 500 centipoises at 25° C. while a 5 percent solution has a viscosity of between about 2000 centipoises and 3000 centipoises at 25° C.

The hydroxyethyl cellulose suitable for use in the invention is likewise water soluble, has a molecular weight of from about 50,000 up to about 1,200,000, and is also commercially available from Union Carbide Corporation under the trademark "Cellosize". This material is really a series of ethers wherein an average of from 0.9 to 1.0 hydroxyl radicals on each anhydroglucose unit of cellulose have been reacted with ethylene oxide and an average of from 1.8 to 2.0 ethylene oxide molecules have attached to each anhydroglucose unit by reaction with a hydroxyl group thereof. Once one ethylene oxide molecule has attached itself at a hydroxyl site, additional ethylene oxide molecules may also attach themselves at the same site in an end to end formation. Alternatively, such molecules may attach themselves at other available hydroxyl sites. Grade QP-100M has a molecular weight of about 1,000,000 and a 0.5 percent solution of this material has a viscosity of between about 300 centipoises and 500 centipoises at 25° C. while a 1 percent solution has a viscosity of between about 4000 centipoises and 6000 centipoises at 25° C.

After the thickener has been dissolved in the water and the water thickened to the desired viscosity, the powdered plastic resin is dispersed therein, and the dispersion is applied to the fibrous textile material by any convenient means, such as by spraying, brushing, rolling, or simply by immersing the material in the dispersion. The plastic resin should be dispersed in the water so as to form a suspension containing from about 15 parts by weight to about 40 parts by weight of resin per 100 parts by weight of water, and the fibrous textile material should be allowed to absorb a sufficient amount of the suspension to provide from about 0.15 gram of resin per gram of fiber to about 4.0 grams of resin per gram of fiber after drying. If necessary, a suitable dispersing agent may be employed to facilitate dispersion of the resin. Likewise, a suitable surfactant may be employed to facilitate wetting of the fibrous material. If desired, conventional additives such as stabilizers, dyes, pigments, nucleating agents, bonding agents, blowing agents, coupling agents, plasticizers, slip agents, antistatic agents, fillers and the like, can also be added to the aqueous solution.

The most convenient means of applying the resin dispersion to the fibrous textile material is by simply immersing the fibrous material in the dispersion until it has become saturated with the dispersion. Alternatively, the dispersion may be applied by spraying it on to the fibrous material by means of a nozzle gun, or by working it in with a brush. Rolling the surface is a common practice which serves to compact the material and further assists in saturating it with the resin.

After the resin dispersion has been applied to the fibrous textile material, the material is dried, e.g., by heating at a temperature of from about 100° C. to about 200° C., and the dried resin-impregnated material is then heated at a temperature sufficiently elevated to cause the resin to fuse and form a matrix for the fibers. When a thermosetting resin is employed, the resin should only be allowed to partially cure to the B-stage during fusion, and should not be completely thermoset at this time. Heating at a temperature of from about 150° C. to about 400° C. is usually sufficient to fuse most resins as well as effect partial curing of those resins that require thermosetting.

The prepreg formed in this manner may be stored and subsequently laminated under heat and pressure to produce a variety of composite articles. Alternatively, it is possible to prepare laminated articles directly from the resin-impregnated textile material without first fusing the resin to form a prepreg. This is accomplished by stacking a plurality of such resin-impregnated materials one upon another, and subjecting the stack to suitable conditions of heat and pressure.

Conventional hot pressing and hot stamping techniques can be employed to produce such laminated articles, regardless of whether they are produced directly from resin-impregnated textiles without prior fusion of the impregnant, or indirectly from prepregs wherein the impregnant has already been fused. When hot pressing is employed, a plurality of the fibrous textile materials to be laminated are laid up one upon another on a suitably shaped mold and formed into a desired shape under a pressure and at a temperature sufficiently elevated to cause the resin-impregnant to fuse (or re-fuse) and bond those materials into a single body. When thermosetting resins are employed, these conditions must be such as to also effect a cure (or complete the cure) of the resin employed. The melt-formed shape is then cooled under confining pressures to a temperature below the melting point of the resin. The composite article formed in this manner may then be trimmed and machined into a desired final product. Alternatively, the fibrous textile materials to be laminated may be cut and fitted to the mold contours and the article molded directly from the blanks. When hot stamping is employed, the procedure is similar except that a plurality of the fibrous textile materials are laid up one upon another, heated at a temperature sufficiently elevated to cause the resin impregnant to fuse (or re-fuse), and then subjected to a pressure sufficient to bond them into a single body of desired shape as they are cooled to a temperature below the melting point of the resin.

Pressures of from about 200 psi. to about 2000 psi. are generally sufficient to produce the desired laminate, regardless of whether hot pressing or hot stamping techniques are employed. The temperature employed will depend upon the particular resin employed. When thermoplastic resins are employed, the temperatures must be sufficiently elevated to fuse the resin. When thermosetting resins are employed, the temperature must also be sufficiently elevated to cure the resin to its thermoset state. Temperatures of from about 150° C. to about 400° C. are generally sufficient to fuse most resins as well as cure those resins that require thermosetting.

Among the thermoplastic resins which can be employed to produce the impregnated textile materials of the present invention are polyethylene, polypropylene, polystyrene, polyphenylene sulphide, polyesters, polysulfones, polyethers, and polycarbonates. Such resins may be readily dispersed in water with the use of a soluble wetting agent, e.g., an alkylaryl polyether alcohol such as Triton X-100 (a registered trademark of Rohm and Haas Co.). The wetting agent is suitably employed in an amount of from about 1 part by weight to about 5 parts by weight per 100 parts by weight of the combined weight of resin and water.

In addition to the thermoplastic resins named above, thermosetting resins such as epoxies, furanes, phenolics, polyimides, and the like can be employed. When such resins are employed, it may be necessary to also employ suitable hardening agents and/or polymerization catalysts in an amount conventionally used to cure the resins.

Penetration of the powdered plastic resin between the filaments of the fibrous material is aided by using particles having as fine a size as possible. For this reason particles having sizes below 50 microns diameter are usually employed, and most preferably the particles employed have diameters approaching the diameter of the filaments of the fibrous material. Such diameters may be of the order of 10 microns or less.

While it is preferred to use carbon fibers in the method of the present invention, other filamentary material, including organic, metallic and mineral fibers, may be employed, either individually or in combination with carbon fibers or with each other. Carbon fibers, however, offer particular advantage, not only because they are very light and strong, but also because they are available in grades with different balances between Young's modulus and tensile strength, so that variations in properties of the reinforced product can be readily achieved. Other suitable fibers include boron, glass and polyamide fibers.

The high strength, high modulus carbon fibers suitable for use in the present invention are commercially available and can be prepared as described in U.S. Pat. Nos. 3,454,362, 3,412,062 and 4,005,183. Such fibers can be employed in any form suitable for impregnation, e.g., as tow, yarn, mat, or in fabric form. Such fabric may be woven fabric such as tape, cloth or other form of broadcloth, or may be non-woven fabric such as felt or batting. The term "carbon" as used herein is intended to include both graphitic and non-graphitic fibers.

The following Examples are set forth for purposes of illustration so that those skilled in the art may better understand this invention. It should be understood that they are exemplary only, and should not be construed as limiting this invention in any manner.

EXAMPLE 1

An aqueous solution containing 0.5 percent by weight polyethylene oxide and 0.5 percent by weight hydroxyethyl cellulose was prepared by adding fine granules of each to water over a 3 minute period while stirring with a propeller, and then allowing the mixture to stand for 18-20 hours to permit complete dissolution. The polyethylene oxide employed was "Polyox" WSR N-3000, a fine white granular solid having a molecular weight of about 400,000. The hydroxyethyl cellulose employed was "Cellosize" (QP-100M, also a fine white granular material, having a molecular weight of about 1,000,000. Both materials are manufactured by Union Carbide Corporation.

The aqueous solution produced in this manner had a smooth, creamy consistency. The viscosity of the solution was 400 centipoises at 25° C.

One hundred sixty-two grams (162 g.) of a polysulfone resin which had been passed through a No. 80 U.S. Standard sieve (0.177 mm. openings) were then blended into 800 gms. of the solution over a 5 minute period using a power-operated mixer. The consistency of the solution was such as to cause the resin particles to be suspended therein, and a uniform dispersion resulted.

A 21"×42" piece of eight harness satin weave carbon fiber cloth ("Thornel"* VC-0150 Pitch-Based 8HS), weighing 300 grams, was coated with the dispersion by dipping a hard roller into the dispersion and passing it over the cloth until the cloth was saturated with the dispersion. The coated cloth was then dried by heating at 100° C. and subsequently heated to 350° C. to fuse the polysulfone resin and form a matrix for the fibers.

*"Thornel" is a registered trademark of Union Carbide Corp."

The prepreg formed in this manner was then cut into six 10"×10" squares which were stacked in a pile with the warp of the cloth in one direction. The stack was placed between platens in a hydraulic press, and the platens were then heated to a temperature of 325° C. and a pressure of 1000 psi. was applied to the stack. The temperature of the platens was maintained at 325° C. for 10 minutes after which heating was discontinued. The pressure was not released until the temperature of the platens fell below 150° C.

A flat, rigid laminated plate was produced in this manner.

EXAMPLE 2

The procedure of Example 1 was employed to produce a uniform dispersion of 180 grams of polypropylene resin in 1000 grams of the aqueous solution of polyethylene oxide and hydroxyethyl cellulose produced in accordance with Example 1. The polypropylene resin employed had first been passed through a No. 60 U.S. Standard sieve (0.250 mm. openings).

A carbon cloth similar to the one described in Example 1 was then coated with the dispersion employing the procedure described therein. The coated cloth was then dried by heating at 100° C. and subsequently heated to 175° C. to fuse the polypropylene impregnant and form a matrix for the fibers.

The impregnated cloth was then cut into squares, stacked, and hot-pressed in the hydraulic press as described in Example 1 employing a temperature of 175° C. and a pressure of 500 psi.

A flat, rigid, laminated plate was produced by this procedure.

EXAMPLE 3

The procedure of Example 1 was employed to produce a uniform dispersion of 162 grams of a thermoplastic polyester resin in 800 grams of the aqueous solution of polyethylene oxide and hydroxyethyl cellulose produced in accordance with Example 1. The polyester resin employed had first been passed through a No. 80 U.S. Standard sieve (0.177 mm. openings).

A carbon cloth similar to the one described in Example 1 was then coated with the dispersion employing the procedure described therein. The coated cloth was then dried by heating at 100° C. Without any further heating or attempt to fuse the resin, the impregnated cloth was cut into squares, stacked, and hot-pressed in the hydraulic press as described in Example 1 employing a temperature of 250° C. and a pressure of 1000 psi.

A flat, rigid, laminated plate was produced by this procedure.

EXAMPLE 4

The procedure of Example 1 was employed to produce a uniform dispersion of 358 grams of a polyphenylene sulfide resin in 1000 grams of the aqueous solution of polyethylene oxide and hydroxyethyl cellulose produced in accordance with Example 1. The polyphenylene sulfide resin employed had first been passed through a No. 80 U.S. Standard sieve (0.177 mm. openings).

A 42"×30" piece of carbon cloth similar to the one described in Example 1, weighing 436 grams, was then coated with the dispersion employing the procedure described therein. The cloth was then dried by heating at 100° C. Without any further heating or attempt to fuse the resin, the impregnated cloth was cut into six 10"×10" squares which were stacked and hot-pressed in the hydraulic press as described in Example 1 employing a temperature of 325° C. and a pressure of 250 psi.

A flat, rigid, laminated plate was produced by this procedure.

EXAMPLE 5

The procedure of Example 1 was employed to produce a uniform dispersion of 21 grams of a polypropylene resin in 105 grams of the aqueous solution of polyethylene oxide and hydroxyethyl cellulose produced in accordance with Example 1. The polypropylene resin employed had first been passed through a No. 80 U.S. Standard sieve (0.177 mm. openings).

A 21"×42" piece of glass fiber cloth, having a style 120 weave and weighing 35 grams, was coated with the dispersion by dipping a hand roller into the dispersion and passing it over the cloth until the cloth was saturated with the dispersion. The coated cloth was then dried by heating at 100° C. and subsequently heated to 175° C. to fuse the polypropylene resin and form a matrix for the fibers.

The prepreg formed in this manner was cut into 10"×10" squares. Three of these squares were then stacked in a pile with four 10"×10" squares of the carbon fiber cloth prepreg produced in accordance with Example 2. The squares were laid up to produce a stack having alternating layers of carbon fiber cloth prepreg and glass fiber cloth prepreg. The warp of the cloth of each square was placed to run in one direction.

The stack was then hot-pressed in the hydraulic press as described in Example 1 employing a temperature of 175° C. and a pressure of 500 psi.

A flat, rigid, laminated plate was produced by this procedure.

EXAMPLE 6

The procedure of Example 1 was employed to produce a uniform dispersion of 495 grams of "Kerimid"* 601 thermosetting polyimide resin in 2500 grams of the aqueous solution of polyethylene oxide and hydroxyethyl cellulose produced in accordance with Example 1. The polyimide resin system employed had first been passed through a No. 60 U.S. Standard sieve (0.250 mm. openings).

*"Kerimid" is a registered trademark of Rhodia, Inc.

A 40"×85" piece of "Thornel"** VMF-75 fiber mat, weighing 165 grams, was then coated with the dispersion in the manner described in Example 1. The coated cloth was then dried by heating at 100° C. Without any further heating or attempt to fuse the resin, the impregnated cloth was cut by means of a die into twenty rings having inner diameters of 8.5" and outer diameters of 12". The rings were then stacked in a pile in a cavity mold and hot-pressed in the hydraulic press as described in Example 1 employing a temperature of 250° C. and a pressure of 500 psi. for 30 minutes.

**"Thornel" is a registered trademark of Union Carbide Corporation.

A flat, rigid, circular, laminated plate was produced by this procedure.

While the foregoing specification describes the treatment of a fibrous textile material with a dispersion of a powdered plastic resin in water which has been thickened by means of a water-soluble thickener, it should be understood that non-aqueous solvents can also be thickened in like manner and employed to effect such treatment.

What is claimed is:

1. A method of impregnating a fibrous textile material with a plastic resin which comprises forming a dispersion of a powdered plastic resin in water; adding to the dispersion a water-soluble thickener selected from the group consisting of polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch, agar-agar, casein and gelatin, in an amount sufficient to impart to the dispersion a viscosity of at least about 300 centipoises to 5000 centipoises at 25° C.; applying the dispersion to a fibrous textile material to distribute the resin over the fibers thereof; maintaining the dispersion in contact with the fibrous textile material for a period of time sufficient to allow the fibrous textile material to absorb an amount of the dispersion sufficient to provide from about 0.15 gram of resin per gram of fiber to about 4.0 grams of resin per gram of fiber after drying; drying the fibrous textile material treated in this manner to remove the water present; and heating the dried material at a temperature sufficiently elevated to cause the resin to fuse and form a matrix for the fibers.

2. A method as in claim 1 wherein the plastic resin employed is a thermoplastic resin.

3. A method as in claim 2 wherein the thermoplastic resin is a polysulfone resin.

4. A method as in claim 2 wherein the thermoplastic resin is a polypropylene resin.

5. A method as in claim 2 wherein the thermoplastic resin is a polyester resin.

6. A method as in claim 4 wherein the thermoplastic resin is a polyphenylene sulfide resin.

7. A method as in claim 1 wherein the plastic resin is a thermosetting resin.

8. A method as in claim 7 wherein the thermosetting resin is a polyimide resin.

9. A method of impregnating a fibrous textile material with a plastic resin which comprises forming a dispersion of a powdered plastic resin in water containing from about 15 parts by weight to about 40 parts by weight of resin per 100 parts by weight of water; adding to the dispersion a water-soluble thickener selected from the group consisting of polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch, agar-agar, casein and gelatin, in an amount sufficient to impart to the dispersion a viscosity of at least about 300 centipoises to 5000 centipoises at 25° C.; applying the dispersion to a fibrous textile material to distribute the resin over the fibers thereof; maintaining the dispersion in contact with the fibrous textile material for a period of time sufficient to allow the fibrous textile material to absorb an amount of the dispersion sufficient to provide from about 0.15 gram of resin per gram of fiber to about 4.0 grams of resin per gram of fiber after drying; drying the fibrous textile material treated in this manner to remove the water present; and heating the dried material at a temperature sufficiently elevated to cause the resin to fuse and form a matrix for the fibers.

10. A method as in claim 9 wherein the powdered plastic resin has a particle size in the range of between about 10 and 50 microns in diameter.

11. A method as in claim 9 wherein the plastic resin is selected from the group consisting of polyethylene, polypropylene, polystyrene, polyphenylene sulphide, polyesters, polysulfones, polyethers and polycarbonates.

12. A method as in claim 9 wherein the plastic resin is selected from the group consisting of epoxies, furanes, phenolics and polyimides.

13. A method of impregnating a fibrous textile material with a plastic resin which comprises forming a dispersion of a powdered plastic resin in water containing from about 15 parts by weight to about 40 parts by weight of resin per 100 parts by weight of water; adding to the dispersion a water-soluble thickener selected from the group consisting of polyethylene oxide and hydroxyethyl cellulose and mixtures thereof, in an amount sufficient to impart to the dispersion a viscosity of from about 400 centipoises to 3000 centipoises at 25° C.; applying the dispersion to a fibrous textile material to distribute the resin over the fibers thereof; maintaining the dispersion in contact with the fibrous textile material for a period of time sufficient to allow the fibrous textile material to absorb an amount of the dispersion sufficient to provide from about 0.15 gram of resin per gram of fiber to about 4.0 grams of resin per gram of fiber after drying; drying the fibrous textile material treated in this manner to remove the water present; and heating the dried material at a temperature sufficiently elevated to cause the resin to fuse and form a matrix for the fibers.

14. A method of impregnating a fibrous textile material with a plastic resin which comprises forming a dispersion of a powdered plastic resin in water containing from about 15 parts by weight to 40 parts by weight of resin per 100 parts by weight of water, said plastic resin being selected from the group consisting of polyethylene, polypropylene, polystyrene, polyphenylene sulfide, polyesters, polysulfones, polyethers, polycarbonates, epoxies, furanes, phenolics and polyimides, and having a particle size in the range of between about 10 and 50 microns in diameter; adding to the dispersion a water-soluble thickener selected from the group consisting of polyethylene oxide, ethyl methyl cellulose, hydroxyethyl cellulose, hydroxyethyl methyl cellulose, hydroxypropyl methyl cellulose, methyl cellulose, polyacrylamid, polyvinyl alcohol, polyvinyl methyl ether, starch, agar-agar, casein and gelatin, in an amount sufficient to impart to the dispersion a viscosity of from about 400 centipoises to 3000 centipoises at 25° C.; applying the dispersion to a fibrous textile material to distribute the resin over the fibers thereof; maintaining the dispersion in contact with the fibrous textile material for a period of time sufficient to allow the fibrous textile material to absorb an amount of the dispersion sufficient to provide from about 0.15 gram of resin per gram of fiber to about 4.0 grams of resin per gram of fiber after drying; drying the fibrous textile material treated in this manner to remove the water present; and heating the dried material at a temperature sufficiently elevated to cause the resin to fuse and form a matrix for the fibers.

15. A method of fabricating a composite article which comprises forming a dispersion of a powdered plastic resin in water containing from about 15 parts by weight to about 40 parts by weight of resin per 100 parts by weight of water; adding to the dispersion a water-soluble thickener selected from the group consisting of polyethylene oxide, ethyl methyl cellulose, hydroxyethyl cellulose, hydroxyethyl methyl cellulose, hydroxy propyl methyl cellulose, methyl cellulose, polyacrylamid, polyvinyl alcohol, polyvinyl methyl ether, starch, agar-agar, casein and gelatin, in an amount sufficient to impart to the dispersion a viscosity of at least about 300 centipoises to 5000 centipoises at 25° C.; applying the dispersion to a plurality of fibrous textile sheets to distribute the resin over the fibers thereof; maintaining the dispersion in contact with the fibrous textile sheets for a period of time sufficient to allow the fibrous textile sheets to absorb an amount of the dispersion sufficient to provide from about 0.15 gram of resin per gram of fiber to about 4.0 grams of resin per gram of fiber after drying; drying the fibrous textile sheets treated in this manner to remove the water present; stacking the resin impregnated fibrous textile sheets one upon another; and heating the stack of fibrous textile sheets at a temperature sufficiently elevated to fuse the resin while at the same time applying pressure to the stack in order to hot press the sheets together to form the composite article.

16. A method of impregnating a carbon or graphite cloth with a plastic resin which comprises forming a dispersion of a powdered plastic resin in water; adding to the dispersion of water-soluble thickener selected from the group consisting of polyethylene oxide, ethyl methyl cellulose, hydroxyethyl cellulose, hydroxyethyl methyl cellulose, hydroxypropyl methyl cellulose, methyl cellulose, polyacrylamid, polyvinyl, alcohol, polyvinyl methyl ether, starch, agar-agar, casein and gelatin, in an amount sufficient to impart to the dispersion a viscosity of at least about 300 centipoises to 5000 centipoises at 25° C.; applying the dispersion to a carbon or graphite cloth to distribute the resin over the fibers thereof; maintaining the dispersion in contact with the carbon or graphite cloth for a period of time sufficient to allow the carbon or graphite cloth to absorb an amount of the dispersion sufficient to provide from about 0.15 gram of resin per gram of fiber to about 4.0 grams of resin per gram of fiber after drying; drying the carbon or graphite cloth treated in this manner to remove the water present; and heating the dried material at a temperature sufficiently elevated to cause the resin to fuse and form a matrix for the fibers.

17. A method of impregnating a fibrous textile material with a plastic resin which comprises forming a dispersion of a powdered plastic resin in water; adding to the dispersion a water-soluble thickener in an amount sufficient to impart to the dispersion a viscosity of at least about 300 centipoises to 5000 centipoises at 25° C.; applying the dispersion to a fibrous textile material to distribute the resin over the fibrous thereof; maintaining the dispersion in contact with the fibrous textile material for a period of time sufficient to allow the fibrous textile material to absorb an amount of the dispersion sufficient to provide from about 0.15 gram of resin per gram of fiber to about 4.0 grams of resin per gram of fiber after drying; drying the fibrous textile material treated in this manner to remove the water present; and heating the dried material at a temperature sufficiently elevated to cause the resin to fuse and form a matrix for the fibers.

* * * * *

UNITED STATES PATENT AND TRADEMARK OFFICE
CERTIFICATE OF CORRECTION

PATENT NO.   : 4,292,105
DATED        : Sep. 29, 1981
INVENTOR(S)  : Gordon J. Taylor It is certified that error appears in the above—identified patent and that said Letters Patent is hereby corrected as shown below:

Column 5, line 49, the parenthesis before "QP-100M" should be deleted.

Signed and Sealed this

Twenty-ninth Day of June 1982

[SEAL]

Attest:

Attesting Officer

GERALD J. MOSSINGHOFF

Commissioner of Patents and Trademarks